United States Patent Office 3,657,199
Patented Apr. 18, 1972

3,657,199
NOVEL COMPOSITIONS
Adnan A. R. Sayigh and Fred A. Stuber, North Haven, and Henri Ulrich, North Branford, Conn., assignors to The Upjohn Company, Kalamazoo, Mich.
No Drawing. Continuation-in-part of abandoned application Ser. No. 829,094, May 29, 1969. This application Nov. 27, 1970, Ser. No. 93,447
Int. Cl. C08f 27/08, 27/12
U.S. Cl. 260—78.5 T                                   6 Claims

ABSTRACT OF THE DISCLOSURE

Light sensitive ester-amide polymers are provided. The polymers are characterized by the recurring unit:

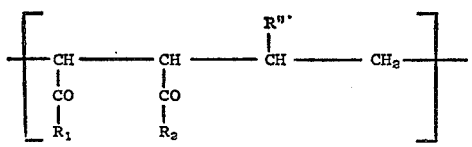

wherein one of $R_1$ and $R_2$ represents —O— (lower-alkyl) and the other of $R_1$ and $R_2$ represents —NHR wherein R is a stilbene residue having the formula:

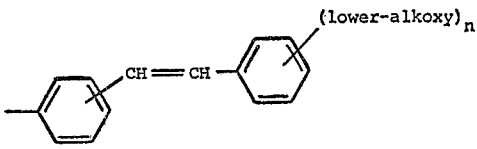

$n = 1$ to 3, and $R'' =$ lower-alkoxy or phenyl. The polymers have an average molecular weight within the range of about 100,000 to about 1,250,000. The above ester-amide polymers undergo cross-linking on exposure to ultraviolet light and can be used in photo-resist systems. The above ester-amide polymers are prepared by reacting the appropriate vinyl ether-maleic anhydride or styrene-maleic anhydride copolymer with the appropriate aminostilbene and esterifying the intermediate amide amine salt with a lower-aliphatic alcohol.

CROSS-REFERENCE TO RELATED APPLICATIONS

This application is a continuation-in-part of our co-pending application Ser. No. 829,094, filed May 29, 1969, now abandoned.

BACKGROUND OF THE INVENTION (1) Field of the invention

This invention relates to novel ester-amide polymers and is more particularly concerned with light sensitive ester-amide polymers having alkoxy-substituted stilbene residues in the amide moieties thereof, and with photo-resist systems incorporating said polymers.

(2) Description of the prior art

So far as is known the ester-amide polymers of the invention are a novel class of polymers.

SUMMARY OF THE INVENTION

The present invention comprises a light-sensitive ester-amide polymer characterized by a recurring unit of the formula:

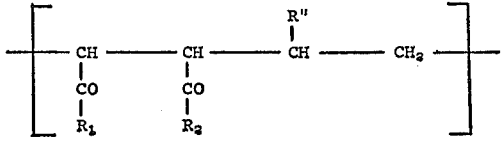

wherein one of $R_1$ and $R_2$ represents —O— (lower-alkyl) and the other of $R_1$ and $R_2$ represents —NHR wherein R is a stilbene residue having the formula:

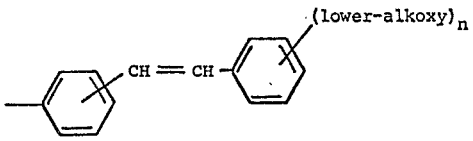

$n$ is an integer from 1 to 3, and $R''$ is selected from the class consisting of lower-alkoxy and phenyl.

The light sensitive ester-amide polymers of the above formula can be employed in photo-resist systems and are accordingly useful in photolithographic and photomechanical processes as will be described and exemplified more fully hereinafter.

The invention also comprises (a) photo-resist systems which contain a light sensitive ester-amide polymer defined above and (b) the polymers derived by the photopolymerization of the light sensitive ester-amide polymers defined above.

The term "lower-alkyl" as used herein means alkyl from 1 to 8 carbon atoms, inclusive, such as methyl, ethyl, propyl, butyl, pentyl, hexyl, heptyl, octyl, and isomeric forms thereof. The term "lower-alkoxy" as used herein means alkoxy from 1 to 8 carbon atoms, inclusive, such as methoxy, ethoxy, propoxy, butoxy, pentyloxy, hexyloxy, heptyloxy, octyloxy and the like.

It is to be noted that the stilbene residues R which occur in the recurring unit of Formula I can exist in both cis and trans forms. It is to be understood that both the cis and trans forms as well as mixtures thereof are included within the scope of this invention.

DETAILED DESCRIPTION OF THE INVENTION

The novel ester-amide polymers of the invention, characterized by the recurring unit of Formula I, are prepared conveniently by a two-step procedure from the corresponding copolymers of (a) maleic anhydride and (b) styrene or the appropriate vinyl lower-alkyl ether. The latter copolymers are well-known in the art and are characterized by a recurring unit having the following structure

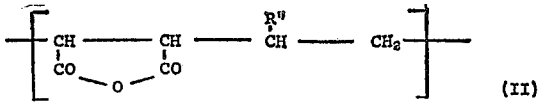

(II)

wherein $R''$ is as defined above.

In the first step of the process for preparing the ester-amide polymers of the invention, the starting maleic anhydride copolymer having the recurring unit represented by (II) above is reacted with the appropriate aminostilbene having the formula:

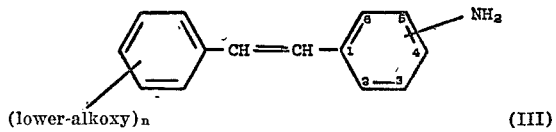

(lower-alkoxy)$_n$                                                                                                           (III)

wherein $n$ and lower-alkoxy have the significance hereinbefore defined and $NH_2$ is in the 2, 3, or 4-position. Advantageously, the reactants are brought together in the presence of an inert organic solvent, i.e. an organic solvent which does not enter into reaction with either of the reactants or otherwise interfere with the desired course of the reaction. Examples of inert organic solvents are benzene, toluene, xylene, tetrahydronaphthalene, decahydronaphthalene, chlorobenzene, 1,2,4-trichlorobenzene, tetrahydrofuran, dioxane, dimethylsulfoxide, diethylene glycol dimethylether (diglyme), diethylether, N,N-dimethylformamide, hexamethylphosphoramide, ethylacetate, Cellosolve acetate and the like.

The reaction which occurs in the first step of the process can be represented schematically as follows wherein the conversion of a single unit in the starting copolymer chain is shown for purposes of simplicity.

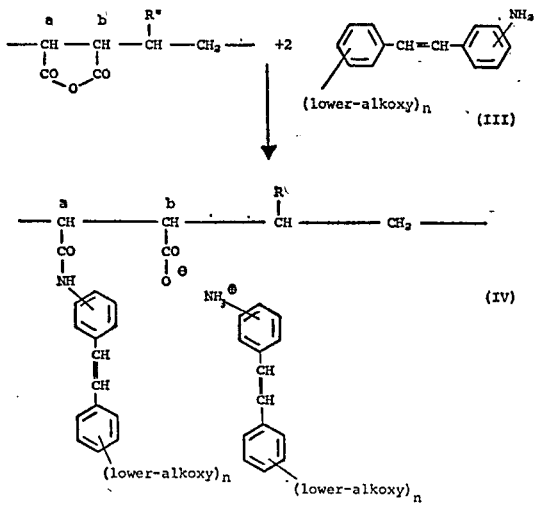

wherein R", lower-alkoxy, and $n$ are as hereinbefore defined. As will be seen from the equation, the product of conversion of the anhydride moiety is the amine salt of the amide-acid (IV) produced by ring opening and half-amide formation.

For the sake of simplicity the reaction scheme shown above illustrates the opening of the anhydride ring in the starting copolymer chain so that the carbon atom "a" in the final product has the amide moiety attached thereto and the carbon atom "b" has the carboxylic acid salt moiety attached thereto. As will be readily appreciated by one skilled in the art, the anhydride moiety in the starting polymer can open in the reverse manner so that the final product will have the amide moiety attached to carbon atom "b" and the carboxylic acid salt moiety attached to carbon atom "a." It will be further appreciated by one skilled in the art that the product obtained by the above reaction will have a largely random distribution of the two possible structures in the units in the chain of the final product. It is to be understood that the specification and claims of this application are not limited to polymers having only one of the two possible structures in the recurring unit but are intended to encompass all possible structures within the polymer chain.

Advantageously the reactants are brought together in substantially stoichiometric proportions, i.e. in the proportion of 2 moles of aminostilbene (III) for each anhydride moiety in the maleic anhydride copolymer having the recurring unit (II) which is to be converted. The above illustrated reaction then takes place at each of the recurring uints (II) of the starting copolymer. However, as will be obvious to one skilled in the art, by employing less than the stoichiometric proportion of aminostilbene (III) in the above first step of the process of the invention it is possible to obtain products in which less than all the anhydride groups in the starting copolymer have been converted to the corresponding amide-acid salt. Further, one can carry out the reaction using less than the stoichiometric proportion of aminostilbene (III) and obtain an intermediate in which only a portion of the anhydride groups in the starting copolymer have been converted. This intermediate is then reacted with an appropriate proportion of a second aminostilbene, i.e. an aminostilbene (III) other than the one previously employed. Mixed products, i.e. products containing different stilbene residues in the various units of the polymer, can thus be obtained.

The reaction between the maleic anhydride copolymer and the aminostilbene (III) is carried out advantageously at a temperature within the range of about 25° C. to about 180° C. and preferably within the range of about 50° C. to about 100° C. The progress of the reaction can be followed by conventional procedures. For example, the appearance of infrared spectral bands characteristic of the amide linkage and/or the disappearance of infrared spectral bands characteristic of the anhydride grouping, can be followed as a guide to the progress of the reaction.

When the reaction of maleic anhydride copolymer and aminostilbene (III) is adjudged complete, the amide-acid amine salt (IV) can, if desired, be isolated from the reaction product by procedures well-known in the art. For example, the inert organic solvent can be removed from the reaction mixture by distillation to leave the amide-acid amine salt. The latter can be purified, if desired, by routine procedures such as chromatography and the like. Alternatively, the reaction product, prior to removal of the inert organic solvent, can be extracted firstly with excess acid to liberate the free amide-acid and remove the aminostilbene, and then with aqueous alkali metal hydroxide solution to remove the amide-acid (IV) as its alkali metal salt in aqueous solution. The aqueous alkaline extract is then neutralized, for example, using dilute aqueous mineral acid to liberate the free amide-acid (IV).

However, in most instances, the solution of amide-acid salt (IV) in inert organic solvent solution which is obtained as the reaction product in the first step of the process of the invention, is converted to the desired ester-amide polymer of the invention without isolation or any other treatment. Thus by adding an excess of the appropriate alcohol R'OH, wherein R' is as hereinbefore defined, to the reaction product obtained in the first stage of the process of the invention, and heating the mixture so obtained, advantageously at a temperature within the range of about 50° C. to about 180° C., the amide-acid amine salt (IV) is converted to the desired ester-amide polymer having the recurring unit (I) above.

The conversion of the amide-acid salt (IV) to the corresponding ester-amide polymer of the invention replaces the carboxylic acid salt moiety in the former by the corresponding carboxylic acid ester moiety without affecting the overall structure of the recurring unit, i.e. the position of the amide and the ester moieties relative to the carbon atoms "a" and "b" in the salt (IV). The two possible structures in the unit (IV), and the possible existence of both structures randomly distributed in the polymer chain, have already been discussed above. These various possibilities are not in any way affected by the conversion of the amide-acid salt to the ester amide.

The progress of the reaction can be followed readily using procedures well-recognized in the art. For example, the disappearance of infrared spectral bands characteristic of the free carboxyl group in the amide-acid salt (IV) forms a convenient way of determining the progress of the reaction. When the reaction is complete, the desired ester-amide polymer is isolated therefrom by procedures conventional in the art, for example, the polymer can be precipitated from solution by adding a solvent, such as carbon tetrachloride, in which the polymer is insoluble but the liberated aminostilbene (III) is soluble. Alternatively, the reaction product can be extracted with an excess of aqueous mineral acid to remove the liberated aminostilbene (III) and the washed reaction product is then distilled to remove the inert organic solvent. The ester-amide polymer having the recurring unit (I) which is obtained thereby can be purified, if desired, by routine procedures such as by chromatography, by solvent extraction, reprecipitation and the like.

The conversion of the starting maleic anhydride copolymers to the ester-amide polymers of the invention is substantially quantitative in most cases and is remarkably simple and convenient as a synthetic procedure.

The maleic anhydride copolymers having the recurring unit (II) which are employed as starting materials in the process of the invention are well-known in the art; see, for example, Encyclopedia of Chemical Technology, edited by Kirk-Othmer, Interscience, New York, N.Y., 1956, volume 8, p. 685 et seq, and volume 11, p. 652; U.S. Pats. 2,424,814 and 2,047,398. These copolymers can be obtained in a wide range of molecular weight, namely, from about 100,000 to about 1,250,000. As will be appreciated by one skilled in the art, the chain length of the starting maleic anhydride copolymer will remain unaffected by the conversion to the ester-amide polymer of recurring unit (I) although the overall molecular weight of the polymer will increase according to the number of anhydride moieties in the starting copolymer which are converted to the corresponding ester-amide moieties.

In general the molecular weight of the ester-amide polymers of the invention will be within the range of about 150,000 to about 2,300,000. Said polymers are, for the most part resinous solids which are soluble in polar solvents such as acetone, methyl ethyl ketone, tetrahydrofuran, dioxane, and the like, from which they can be cast as films as will be described in more detail hereinafter.

The aminostilbenes (III) which are employed as starting materials in the process described above can be prepared from the corresponding nitrostilbenes using reduction conditions conventional in the art for the reaction of aromatic nitro compounds without simultaneous reduction of the olefinc double bond present in the molecule. Illustrative of said reduction conditions are the use of (a) stannous chloride in the presence of hydrochloric acid under the conditions described, for example, by Peck et al., Journal American Chemical Society, 74, 468, 1952, for the reduction of 4-dimethylamino-4'-nitrostilbene to 4-dimethylamine-4'-aminostilbene, (b) aqueous ferrous sulfate in the presence of ammonium hydroxide, (c) Raney nickel, (d) titanous chloride or titanous sulfate in the presence of hydrochloric or sulfuric acid, respectively, and (e) metallic tin, zinc, or iron in the presence of hydrochloric acid.

The nitrostilbenes which are employed in the preparation of the aminostilbenes (III) using the above reduction procedures can be represented by the formula:

(V)

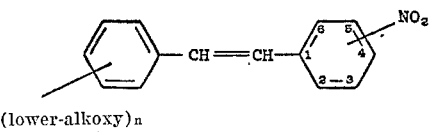

(lower-alkoxy)$_n$ wherein lower-alkoxy and $n$ are as hereinbefore defined and $NO_2$ is in the 2-, 3-, or 4-position in the phenyl nucleus to which it is attached. The nitrostilbenes (V) can exist in both cis- and trans-forms as well as mixtures thereof, and, upon reduction, give rise to the corresponding aminostilbenes (III) in cis- or trans-forms or mixtures thereof.

The nitrostilbenes (V) can themselves be prepared by conventional procedures. For example, the nitrostilbenes (V) can be prepared by condensing the corresponding lower alkoxy benzaldehyde with the appropriate 2- or 4-nitrotoluene or the appropriate 2-, 3-, or 4-nitrophenylacetic acid. Said condensation of the appropriate lower-alkoxybenzaldehyde and the nitrotoluene can be carried out illustratively under the conditions described by Peck et al., supra. The condensation of the appropriate lower-alkoxybenzaldehyde and the nitrophenylacetic acid generally occurs with intermediate formation of the corresponding cinnamic acid of the formula:

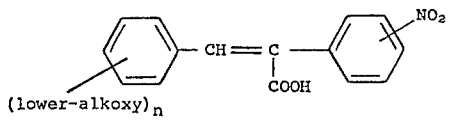

(lower-alkoxy)$_n$ wherein lower-alkoxy and $n$ have the significance hereinbefore defined. Said cinnamic acid can be isolated and subsequently decarboxylated by heating, or it can be decarboxylated in situ by carrying out the final stages of the condensation of aldehyde and nitrophenyl acetic acid at temperatures above that at which decarboxylation commences. Typical of the latter procedures is that described by Kaufman, Berichte, 54, 795, 1921. Where piperidine is employed as catalyst, this latter procedure generally gives rise exclusively to the trans isomer of the desired nitrostilbene (V). The method in which the intermediate cinnamic acid is isolated prior to decarboxylation has the advantage that it enables either the cis- or trans-isomer of the desired nitrostilbene (V) to be isolated by suitable choice of decarboxylation conditions. As shown by Ulrich et al. Journal of Organic Chemistry 31, 4146, 1966, decarboxylation of the above cinnamic acid by heating in inert organic solvents such as benzene, toluene, and the like, in the presence of piperidine or morpholine gives rise to the trans-isomer of the nitrostilbene (V). Decarboxylation of the above cinnamic acid in the presence of copper chromite in quinoline solution yields the cis-isomer of the corresponding nitrostilbene (V).

The lower-alkoxybenzaldehydes, nitrotoluenes and nitrophenylacetic acids employed as described above to prepare the nitrostilbenes (V) can be prepared by general procedures well-recognized in the art. Illustratively, methods for the preparation of the alkoxybenzaldehydes, nitrotoluenes and nitrophenyl-acetic acids are summarized at pages 507 et seq., pages 135 et seq. and pages 593 et seq., respectively, of Chemistry of Carbon Compounds, edited by E. H. Rodd, volume IIIA, Elsevier, N.Y., 1954.

The preparation of the aminostilbenes (III), employed as starting materials in the process of the invention, is further illustrated and exemplified by Preparations 1–5 set forth hereinafter.

The novel ester-amide polymers of the invention, characterized by the recurring unit (I), are photosensitive materials and undergo further polymerization on exposure to radiation of a wavelength within the range of about 200 to 410 nm. This property of the novel ester-amide polymers of the invention renders them particularly useful in the preparation of photoresist systems. For example, the polymers of the invention can be employed in the photographic reproduction and printing arts to produce printing masters as follows. The ester-amide polymers of the invention are dissolved in a polar organic solvent such as tetrahydrofuran, acetone, methyl ethyl ketone, Cellosolve, dioxane and the like, and cast as films on appropriate substrates such as paper, metal and the like film supports normally employed in the reproduction art. A negative of the image to be reproduced, e.g. lined, screened or half tone negatives or diapositives, is interposed between the supported film so obtained and a source capable of producing radiation within the wavelengths set forth above. The photosensitive ester-amide polymer in those portions of the supported film which receive the radiation is cross-linked by the action of the radiation and rendered insoluble. The amount of cross-linking produced at any given area of the supported film is directly related to the amount of radiation received thereat.

After exposure of the supported film to the radiation the ester-amide polymer which has not received radiation, and has, accordingly, not been cross-linked, is dissolved out by means of a solvent, leaving the cross-linked, insoluble, light-sensitized polymer on the surface of the film support in the form of a positive image corresponding to the negative used in the irradiation step. Said image is resistant to solvents, acids, weak alkalies, water etc., as well as to abrasion, mechanical stresses and the like, and hence possesses obvious advantages over images prepared by hitherto conventional reproduction processes.

In similar manner the photoresist systems produced from the ester-amide polymers of the invention can be used in other photoresist applications such as in the printing of microcircuitry and related applications which involve production of an image, in the form of insoluble polymer, on a metal substrate such as copper, followed by removal, in part or in toto, of the uncoated metal by etching. Essentially the same technique as that described above is employed in the formation of the insoluble polymer image on the substrate.

The following preparations and examples describe the manner and process of making and using the invention and set forth the best mode contemplated by the inventors of carrying out the invention but are not to be construed as limiting.

PREPARATION 1

*trans-2,5-dimethoxy-4'-aminostilbene*

A solution of 70 g. of ferrous sulfate in 100 ml. of water was heated to the boiling point and stirred while a total of 100 ml. of aqueous 58 percent ammonium hydroxide and a solution of 5 g. of trans-2,5-dimethoxy-4'-nitrostilbene Ulrich et al., supra) in 200 ml. of methanol were added simultaneously, as separate streams, over a period of 15 minutes. After the addition was complete, the resulting dark solution was heated with stirring at 65° C. to 70° C. for a further 2 hours. The product so obtained was heated on a steam bath to remove methanol and ammonia and the residue was extracted with four portions, each of 100 ml. of ether. The ethereal extracts were combined, washed with water, and dried over anhydrous magnesium sulfate. The dried solution was filtered and the filtrate was evaporated to dryness. The residue (3 g.: M.P. 89 to 91° C.) was recrystallized from ethanol to give trans-2,5-dimethoxy-4'-aminostilbene in the form of a yellow crystalline solid having a melting point of 91° C. to 92° C. The infrared spectrum of this material (CHCl$_3$ solution) exhibited maxima at 2.75 and 2.95$\mu$ (—NH$_2$ stretching vibration), 6.18$\mu$ (C=C stretching vibration), and 10.35$\mu$ (=CH out of plane deformation).

Using the above procedure, but replacing trans-2,5-dimethoxy-4'-nitrostilbene by the corresponding cis-isomer (Ulrich et al., supra), there is obtained cis-2,5-dimethoxy-4'-aminostilbene.

PREPARATION 2

*cis-3,4,5-trimethoxy-4'-aminostilbene*

(A) *cis - 3,4,5-trimethoxy-4'-nitrostilbene.*—Following the procedure described by Ulrich et al., supra, for the preparation of cis-2,5-dimethoxy-4'-nitrostilbene, but replacing 2,5-dimethoxybenzaldehyde by 3,4,5-trimethoxybenzaldehyde, there is obtained cis-3,4,5-trimethoxy-4'-nitrostilbene.

(B) *cis - 3,4,5-trimethoxy-4'-aminostilbene.*—Using the procedure described in Preparation 1, but replacing trans-2,5-dimethoxy-4'-nitrostilbene by cis-3,4,5-trimethoxy-4'-nitrostilbene, there is obtained cis-3,4,5-trimethoxy-4'-aminostilbene.

Similarly using the procedure described by Ulrich et al., supra, for the preparation of cis-2,5-dimethoxy-4'-nitrostilbene, but replacing 2,5-dimethoxybenzaldehyde by 4-butoxybenzaldehyde, 2 - butoxy - 3-ethoxybenzaldehyde, 2,3 - diethoxybenzaldehyde, 3,4 - diisopropoxybenzaldehyde, 3,4 - dimethoxybenzaldehyde, 4 - ethoxy - 2,6-dimethoxybenzaldehyde, 3 - ethoxy-2-hexyloxybenzaldehyde, 3 - ethoxy - 2 - pentyloxybenzaldehyde, 2-isobutoxy-3 - methoxybenzaldehyde, 5 - nitro - 2 - pentyloxybenzaldehyde, or 2,4,6-trimethoxybenzaldehyde, there are obtained:

cis-4-butoxy-4'-nitrostilbene,
cis-2-butoxy-3-ethoxy-4'-nitrostilbene,
cis-2,3-diethoxy-4'-nitrostilbene,
cis-3,4-diisopropoxy-4'-nitrostilbene,
cis-3,4-dimethoxy-4'-nitrostilbene,
cis-4-ethoxy-2,6-dimethoxy-4'-nitrostilbene,
cis-3-ethoxy-2-hexyloxy-4'-nitrostilbene,
cis-3-ethoxy-2-pentyloxy-4'-nitrostilbene,
cis-2-isobutoxy-3-methoxy-4'-nitrostilbene,
cis-2,4,6-trimethoxy-4'-nitrostilbene, respectively.

The latter nitro compounds are then reduced, using the procedure described in Preparation 1, to the corresponding amines, namely:

cis-4-butoxy-4'-aminostilbene,
cis-2-butoxy-3-ethoxy-4'-aminostilbene,
cis-2,3-diethoxy-4'-aminostilbene,
cis-3,4-diisopropoxy-4'-aminostilbene,
cis-3,4-dimethoxy-4'-aminostilbene,
cis-4-ethoxy-2,6-dimethoxy-4'-aminostilbene,
cis-3-ethoxy-2-hexyloxy-4'-aminostilbene,
cis-3-ethoxy-2-pentyloxy-4'-aminostilbene,
cis-2-isobutoxy-3-methoxy-4'-aminostilbene,
cis-2,4,6-trimethoxy-4'-aminostilbene, respectively.

PREPARATION 3

*cis- and trans-2,5-dimethoxy-3'-aminostilbene*

(A) *cis- and trans - 2,5-dimethoxy-3'-nitrostilbene.*—Using the procedure described by Ulrich et al., supra, for the preparation of both cis- and trans-2,5-dimethoxy-4'-nitrostilbene, but replacing the 4-nitrophenylacetic acid used as starting material by 3-nitrophenylacetic acid, there are obtained the cis- and trans-isomers of 2,5-dimethoxy-3'-nitrostilbene.

(B) *cis- and trans-2,5-dimethoxy-3'-aminostilbene.*—Using the procedure described in Preparation 1, but replacing the trans-2,5-dimethoxy-4'-nitrostilbene by the cis- and trans-isomers of 2,5-dimethoxy-3'-nitrostilbene, there are obtained the cis- and trans-isomers of 2,5-dimethoxy-3-aminostilbene.

PREPARATION 4

*trans-2-methoxy-4'-aminostilbene*

(A) *trans-2-methoxy-4'-nitrostilbene.*—A mixture of 10.0 g. (0.073 mole) of o-methoxybenzaldehyde, 13.3 g. (0.073 mole) of p-nitrophenylacetic acid, 1.4 ml. of piperidine and 100 ml. of chlorobenzene was heated under reflux for 3 hours. At the end of this time the chlorobenzene was removed by distillation under reduced pressure. To the residue was added 50 ml. of piperidine and the resulting mixture was heated under reflux for one hour. At the end of this time the piperidine was removed by distillation under reduced pressure and the residue was treated with 50 ml. of ethanol. The yellow solid which separated was isolated by filtration, washed with ethanol and dried. There was thus obtained 9.0 g. of trans-2-methoxy-4'-nitrostilbene in the form of a yellow solid having a melting point of 122° C.

A second run was carried out in exactly the same manner using double the quantity of each reactant set forth above. The material from both runs was combined and recrystallized from isopropanol to obtain recrystallized trans-2-methoxy-4'-nitrostilbene having a melting point of 121° C. to 122° C.

(B) *trans-2-methoxy-4'-aminostilbene.*—A solution of 6 g. of trans-2-methoxy-4'-nitrostilbene in 300 ml. of methanol was hydrogenated in the presence of 1 g. of Raney nickel. The initial pressure of hydrogen was 50 p.s.i. Hydrogenation was complete in 6 hours. At the end of this time the catalyst was removed by filtration and the filtrate was evaporated to dryness to leave 4.95 g. of trans-2-methoxy-4'-aminostilbene. A portion of this material was converted to the corresponding N-acetyl derivative, melting point 135° C. to 137° C., by treatment with excess acetic anhydride followed by addition of the reaction mixture to water.

Using the procedure described by Ulrich et al., supra, 2-methoxybenzaldehyde is condensed with 4-nitrophenyl acetic acid and the intermediate cinnamic acid is decarboxylated to yield cis-2-methoxy-4'-nitrostilbene which is then hydrogenated using the procedure described in Preparation 1, to obtain cis-2-methoxy-4'-aminostilbene.

PREPARATION 5

*trans-4-methoxy-4'-aminostilbene*

(A) *trans-4-methoxy-4'-nitrostilbene.*—A mixture of 10 g. (0.073 mole) of p-methoxybenzaldehyde, 13.3 g. (0.073 mole) of p-nitrophenylacetic acid and 1.4 ml. of piperidine in 100 ml. of chlorobenzene was heated under reflux for 4 hours using a water trap. At the end of this time the solvent was removed by distillation under reduced pressure. The yellow solid which separated was isolated by filtration, washed with ethanol and dried. There was thus obtained 12 g. of trans-4-nitro-4'-methoxystilbene-α-carboxylic acid in the form of a crystalline solid having a melting point of 246° C. to 248° C. The acid so obtained was heated under reflux for 1.5 hours with 50 ml. of piperidine. The resulting solution was evaporated under reduced pressure and the residue was treated with ethanol. The solid was isolated by filtration, washed with ethanol and dried. There was thus obtained 3.3 g. of trans-4-methoxy-4'-nitrostilbene in the form of a crystalline solid having a melting point of 133° C. to 134° C. (Pfeiffer, Berichte, 48, 1739, gives melting point of 133° C. to 134° C. for this compound).

Similarly, trans-4-nitro-4'-methoxystilbene-α-carboxylic acid was prepared in accordance with the first part of the above procedure and was decarboxylated by adding it to a mixture of copper chromite and quinoline at 205° C. to 255° C. in accordance with the procedure of Ulrich et al., supra, to yield cis-4-methoxy-4'-nitrostilbene.

(B) *trans - 4 - methoxy-4'-aminostilbene.*—The trans-4-methoxy-4'-nitrostilbene obtained as described above was reduced using Raney nickel in accordance with the procedure described in Preparation 4, Part B above, to obtain trans-4-methoxy-4'-aminostilbene in the form of a crystalline solid which after recrystallization from isopropanol, had a melting point of 170° C. to 171° C. (Pfeiffer, supra, gives a melting point of 173° C. to 174° C. for this compound).

Similarly, using the procedure described in Preparation 4, Part B above, but replacing trans-2-methoxy-4'-nitrostilbene, there is obtained cis-4-methoxy-4'-aminostilbene.

EXAMPLE 1

A total of 10.2 g. (0.04 mole) of trans-2,5-dimethoxy-4'-aminostilbene was added to a refluxing solution of 3.2 g. of a poly(maleic anhydride co-methylvinyl ether) [having an average molecular weight of 250,000; Gantrez AN 119] in 150 ml. of anhydrous tetrahydrofuran (previously dried by treatment with p-toluene sulfonyl isocyanate followed by distillation). The proportion of aminostilbene used represented 2 moles per anhydride group in the copolymer chain. The progress of the reaction was followed by infrared spectroscopic analysis of an aliquot. When no further increase in absorption at the amide band (5.9μ) of the spectrum was observed, 50 ml. of methanol was added to the reaction mixture and the latter was heated under reflux for a further 16 hours. At the end of this time the reaction mixture was cooled and carbon tetrachloride was added. The solid which separated was isolated by filtration and purified by dissolving in acetone followed by precipitation therefrom by addition of carbon tetrachloride. This procedure was repeated until no further aminostilbene starting material was detected in the solvent washings. The resulting brown solid was dried. There was thus obtained a photosensitive polymer having as the recurring unit a moiety of the following structure:

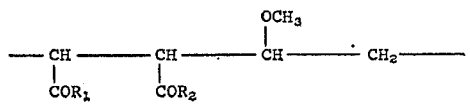

wherein one of $R_1$ and $R_2$ is methoxy and the other is

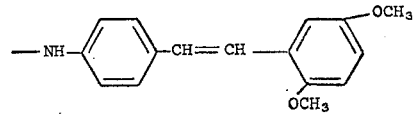

The stilbene residue in the above moiety is in trans-configuration.

The ultraviolet absorption spectrum of the polymer (tetrahydrofuran) exhibited maxima at 302 to 347 nm.

EXAMPLE 2

To a solution of 3.2 g. of a poly(maleic anhydride co-methylvinyl ether) [molecular weight average 250,000; Gantrez AN 119] in 75 ml. of methyl ethyl ketone was added 0.55 g. (0.002 mole) of trans-2,5-dimethoxy-4'-aminostilbene and the resulting mixture was heated under reflux for 80 minutes. [The proportion of aminostilbene employed in the above reaction was sufficient to react with 1 in 20 of the anhydride moieties in the starting polymer.] At the end of this time 50 ml. of methanol and 1 drop of concentrated hydrochloric acid were added. The resulting mixture was heated under reflux overnight (approximately 16 hours). At the end of this time the bulk of the organic solvent was removed by evaporation and the residue was poured into carbon tetrachloride. The solid which separated was isolated by filtration and was purified by dissolving in a small quantity of methanol and pouring the methanol solution into carbon tetrachloride. The resulting brown solid was isolated by filtration and dried. There was thus obtained a modified copolymer of maleic anhydride and methylvinyl ether in which approximately 1 in 20 of the recurring units in the polymer chain had the structure:

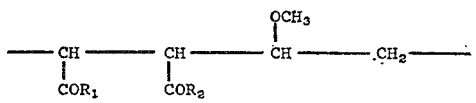

wherein one of $R_1$ and $R_2$ represents methoxy and the other is

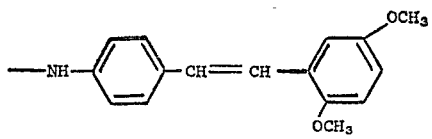

The above procedure was repeated save that the amount of trans-2,5-dimethoxy-4'-aminostilbene employed was increased to 2.1 g. (0.008 mole) corresponding to a proportion sufficient to react with 1 in 5 of the anhydride moieties in the starting polymer. There was thus obtained a modified copolymer of maleic anhydride and methylvinyl ether in which approximately 1 in 5 of the recurring units in the polymer chain had the structure set forth above. The infrared spectrum of the polymer (tetrahydrofuran solution) shows the bands of the ester and amide groups from 5.85μ to 5.95μ.

EXAMPLE 3

Using the procedure described in Example 1, but replacing the trans-2,5-dimethoxy-4'-aminostilbene by cis-2,5-dimethoxy-4'-aminostilbene there is obtained the corresponding photosensitive polymer with recurring unit of the structure shown in Example 1 but having the stilbene moiety in the cis-configuration.

Similarly using the procedure described in Example 1 but replacing the trans-2,5-dimethoxy-4'-aminostilbene there employed by an equivalent amount of cis-3,4,5-trimethoxy-4'-aminostilbene,
cis-4-butoxy-4'-aminostilbene,
cis-2-butoxy-3-ethoxy-4'-aminostilbene,
cis-2,3-diethoxy-4'-aminostilbene,
cis-3,4-diisopropoxy-4'-aminostilbene,
cis-3,4-dimethoxy-4'-aminostilbene, cis-4-ethoxy-2,6-dimethoxy-4'-aminostilbene,
cis-3-ethoxy-2-pentyloxy-4'-aminostilbene,
cis-2-isobutoxy-3-methoxy-4'-aminostilbene,
trans-2-methoxy-4'-aminostilbene,
trans-4-methoxy-4'-aminostilbene, and
cis-2,4,6-trimethoxy-4'-aminostilbene, there are obtained the corresponding ester-amide polymers of the invention.

EXAMPLE 4

Using the procedure described in Example 1 but replacing the methanol employed in the second stage of the reaction by an equivalent amount of butanol there was obtained the corresponding ester-amide polymer having a recurring unit of the structure:

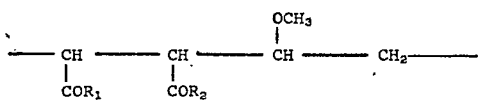

wherein one of $R_1$ and $R_2$ is butoxy and the other is

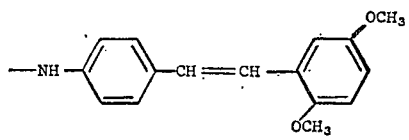

Similarly, using the procedure described in Example 1, but replacing the methanol employed in the second stage of the reaction by isopropyl alcohol, n-amyl alcohol or 1-hexanol there were obtained the corresponding ester-amide polymers in which the esterifying radical was isopropyl, n-amyl, and n-hexyl, respectively.

EXAMPLE 5

Using the procedure described in Example 1, but replacing the poly(maleic anhydride co-methylvinyl ether) there employed by a poly(maleic anhydride co-styrene) having an average molecular weight of 100,000, there was obtained the corresponding ester-amide polymer having the following recurring unit:

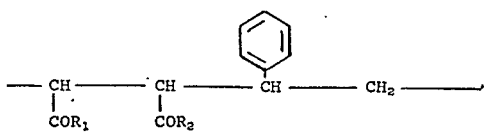

wherein one of $R_1$ and $R_2$ is methoxy and the other is

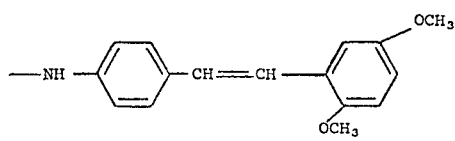

Similarly using the procedure described in Example 1, but replacing the poly(maleic anhydride co-methylvinyl ether) there employed by a poly(maleic anhydride co-butyl vinyl ether) or a poly(maleic anhydride co-hexyl vinyl ether) there were obtained the corresponding ester-amide polymers.

EXAMPLE 6

This example illustrates the use of the photosensitive polymers of the invention as the active components of a typical photoresist system.

A series of negatives were cast on quartz plates as follows:

A 5 percent w./w. solution of the ester-amide polymer obtained as described in Example 1 in a mixture of acetone and Cellosolve (20:1 by volume) was cast on a series of quartz plates (2 x 2 x 1/16 inches) to give films of thickness ranging from 0.0001 to 0.00001 in. (The film on any one plate was substantially uniform in thickness.) The film so obtained was placed at a distance of 30 cm. from the front of a mercury arc lamp (type GE H100 A4/T). A metal plate having a pattern of holes therein was employed as the negative to be reproduced and was mounted between the resist-coated plate and the light source. The resist-coated plate was exposed to light transmitted via the negative for a period of 2 to 5 minutes depending on the thickness of the film. At the end of this time the image on the resist-coated plate was developed by washing with a mixture of methanol, acetone, Cellosolve (30:10:10) and the plate was found to have deposited thereon a solvent insoluble polymer in a pattern corresponding to that of the eight transmitting holes in the negative. The polymer coating so produced was found to be resistant to acid and weak alkali solutions and to abrasive forces.

The above experiment was repeated using a film of photoresist deposited on a thin copper plate. After formation of the insoluble polymer image on the plate, the latter was exposed to 38 percent ferric chloride solution. The surface of the copper plate etched readily but the polymer image was unaffected.

What is claimed is:

1. A light-sensitive ester-amide polymer characterized by the recurring unit of the formula:

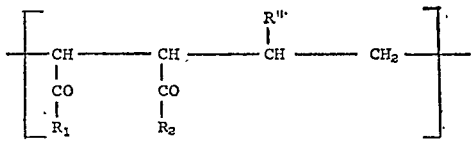

wherein R'' is selected from the class consisting of lower-alkoxy and phenyl, one of $R_1$ and $R_2$ represents —O—(lower-alkyl) and the other of $R_1$ and $R_2$ represents —NHR, wherein R is a stilbene residue having the formula:

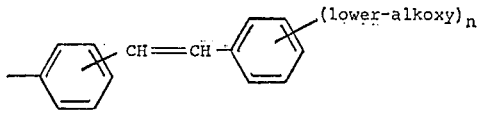

where $n$ is an integer from 1 to 3.

2. A light-sensitive ester-amide according to claim 1 wherein one of $R_1$ and $R_2$ is

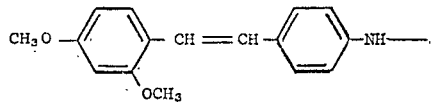

and the other of $R_1$ and $R_2$ is methyl, and R'' is methoxy.

3. A process for the preparation of a light-sensitive ester-amide according to claim 1 which process comprises reacting (a) a maleic anhydride-vinyl co-polymer characterized by the recurring unit:

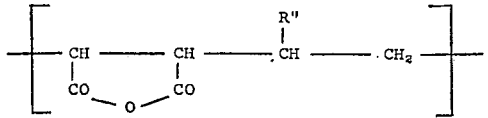

wherein R'' is selected from the class consisting of lower-alkoxy and phenyl, and (b) an aminostilbene having the formula:

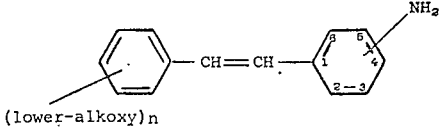

wherein $n$ is an integer from 1 to 3 and the $NH_2$ group is in a position selected from 2-, 3-, and 4-positions and esterifying the resulting amide amine salt with the appropriate alcohol R'OH wherein R' is lower-alkyl.

4. The process of claim 3 wherein the aminostilbene is 2,5-dimethoxy-4'-aminostilbene and the esterifying alcohol R'OH is methanol.

5. A photoresist composition which comprises a light-sensitive ester-amide polymer of claim 1 and a polar organic solvent.

6. A photoresist composition which comprises a light-sensitive ester-amide polymer of claim 2 and a polar organic solvent.

References Cited

UNITED STATES PATENTS 3,016,306  1/1962  Mader et al. _____ 117—33.3

OTHER REFERENCES

Physical Organic Chemistry, vol. 67 (1967), p. 5009, para. 53505H.

JOSEPH L. SCHOFER, Primary Examiner

J. KIGHT III, Assistant Examiner

U.S. Cl. X.R.

96—88; 204—159.22